(12) United States Patent
McBride

(10) Patent No.: US 9,155,284 B2
(45) Date of Patent: Oct. 13, 2015

(54) PORTABLE SUPPORT DEVICE

(71) Applicant: Roger Allen McBride, Linestone, TN (US)

(72) Inventor: Roger Allen McBride, Linestone, TN (US)

(*) Notice: Subject to any disclaimer, the term of this patent is extended or adjusted under 35 U.S.C. 154(b) by 402 days.

(21) Appl. No.: 13/573,877

(22) Filed: Oct. 11, 2012

(65) Prior Publication Data

US 2014/0103279 A1 Apr. 17, 2014

(51) Int. Cl.
*E04H 17/06* (2006.01)
*A01K 3/00* (2006.01)
*E04H 17/26* (2006.01)

(52) U.S. Cl.
CPC ............... *A01K 3/00* (2013.01); *E04H 17/266* (2013.01); *Y10T 29/49826* (2015.01)

(58) Field of Classification Search
CPC ......... E04H 17/02; E04H 17/04; E04H 17/06; E04H 17/08; E04H 17/10; G09F 2007/1834; G09F 15/0056
See application file for complete search history.

(56) References Cited

U.S. PATENT DOCUMENTS

| | | | |
|---|---|---|---|
| 71,278 A | 11/1867 | Clark | |
| 173,403 A | 2/1876 | Hafele | |
| 394,773 A * | 12/1888 | Jones | 256/40 |
| 532,292 A * | 1/1895 | Shirtcliff | 256/43 |
| 560,364 A | 5/1896 | Owens | |
| 565,966 A * | 8/1896 | Deck | 256/40 |
| 618,066 A * | 1/1899 | Diekmann | 52/151 |
| 1,951,282 A | 3/1934 | Hise et al. | |
| 3,865,309 A | 2/1975 | Greenhalgh | |
| 4,104,980 A | 8/1978 | Toomey | |
| 4,203,242 A | 5/1980 | Griffin | |
| 4,712,762 A | 12/1987 | Liedle | |
| 4,923,157 A | 5/1990 | Belamiza | |
| 5,042,780 A | 8/1991 | Yearwood | |
| 5,104,074 A | 4/1992 | Malloy | |
| 5,139,235 A | 8/1992 | Kilmer | |
| 5,356,101 A | 10/1994 | Malloy | |
| 5,881,495 A | 3/1999 | Clark | |
| 5,899,171 A * | 5/1999 | Abrahamson | 119/512 |
| 5,996,973 A | 12/1999 | Campbell | |
| 6,684,580 B1 | 2/2004 | Hull | |
| 6,866,251 B2 | 3/2005 | Rosaen | |
| 6,866,252 B2 | 3/2005 | Pulliam | |
| 7,175,141 B2 | 2/2007 | Bolinder et al. | |
| 7,546,992 B1 | 6/2009 | Cappolina | |

FOREIGN PATENT DOCUMENTS

GB 1 354 057 * 5/1974 ............. E04H 17/02

OTHER PUBLICATIONS

Internet web site, "Signoutfitters.com/yardsignstakes.aspx".

* cited by examiner

*Primary Examiner* — Michael P Ferguson
(74) *Attorney, Agent, or Firm* — Mark L. Davis

(57) ABSTRACT

A portable support device for inserting into the ground and in one embodiment is useful for forming a temporary barricade, corridor or an enclosure arrangement for livestock. The support device has (a) a support frame having a first member, a second member and a cross-brace member rigidly connected to the first and second members and (b) a third member moveably mounted to the cross-brace member and having a free end with a means for securing the third member to the ground. In a preferred embodiment, the support device further includes (c) an angled member having a face portion and spaced-apart first and second ends attached to the first and second members, respectively. The face includes a wire reel or spool holding support means for hanging a reel or spool of wire fencing material of a predetermined length onto the support device.

15 Claims, 2 Drawing Sheets

PORTABLE SUPPORT DEVICE

BACKGROUND OF THE INVENTION

1. Field of the Invention

The present invention relates generally to support device and particularly to fencing systems. More particularly the present invention relates to a sturdy, portable support device that allows for quick installation and removal and is adapted to be used in conjunction with one or more known wire type fencing means to establish a temporary boundary.

2. Description of the Prior Art

Rotational grazing is a pasture management technique that divides a particular pasture into smaller paddocks or areas for livestock grazing or separation in a controlled manner. It is known to use fencing systems for this purpose. The fencing systems must contain the animals' grazing activities to the defined area for a short amount of time. This prevents the livestock from inflicting damage to the grass and in some cases is designed for portion control of the animal(s), particularly in the cases where an animal may be prone to founder, navicular, digestive abnormalities or the pastures contain fresh spring grasses, high in protein. Once a particular paddock has been appropriately grazed the animals are moved to another paddock which allows for the just grazed paddock to quickly and efficiently recover and be ready for the next grazing cycle.

Rotational grazing is beneficial to both the animal and the pasture. The animal does not have to forage down to the grass' roots, or on lower nutritional value growth in the pasture. Another disadvantage of overgrazing is the animal(s) may take in bacteria or other parasites that may be harmful. Since the pasture is never over-grazed, the grass stays healthier and more efficiently replaces the roughage and nutrition that the animal needs. The result is a significant reduction in the acres of pasture required per animal and an improvement in the nutritional quality the pasture produces.

Generally, the more intense the pasture management the shorter a grazing cycle; this necessitates the pasture to have more paddocks. This creates a need for fencing systems to accommodate the animal(s) temporary containment into smaller areas but still allow for free movement from one paddock to a new area for grazing.

Typically, permanent fencing for this type of pasture management is utilized. However, permanent fencing systems are not without their problems. The installation of fence posts has always been a difficult. Holes are generally dug to a predetermined depth using one of several hand digging implements to dig out a hole into which a fence post is inserted. Because conventional posts provide no intrinsic lateral support, the hole must be relatively deep in proportion to the above-ground height of the installed post. Earth removed from the hole during digging is subsequently repacked around the installed post. Posts installed by this method are subject to lateral instability until weathering causes the earth to settle around the post. The earth generally sinks somewhat upon settling, forming a depression around the post which may collect water and subject the post to rot and damage caused by insects attracted to damp conditions. While an anchoring element may be installed adjacent the post to provide lateral support, a substantially larger hole must be dug to accommodate the anchoring element.

Another method in use is to use a prefabricated metal post commonly known as a "T" post. These posts are constructed of steel having a generally T-shaped configuration and has a series of horizontally extending studs vertically spaced along the longitudinal axis. A ram or driver weighted with a relatively dense material, such as lead or cement, is typically used to pound the post directly into the ground without first making a hole. Because of the weight of the driver and the requirement that the force of the driver be applied to the uppermost end of the post, this method is limited in its application to posts of certain lengths, generally 4 to 5 feet once inserted, and is not suitable for installation of posts having ornamental tops. This method is also not suitable for driving posts having large diameters or irregular shapes which might split under pounding, such as the hedgeposts commonly employed in farming and ranching. While there is no easy method for installation of posts in hard clay or rocky soils, driving the post is an especially burdensome task under such conditions. When driven into the ground, these posts provide sufficient support for fencing, but still must have a permanent post, described above, inserted at every $4^{th}$ or $5^{th}$ post to give adequate support for long runs of fence wire.

As can be seen from the description, one problem with both types of the above posts is they are difficult to install and remove.

Another problem with both types of posts is that they must be placed typically in relative close proximity to form a fence of sufficient strength to support a wire fencing means, such a an electric wire or barbed wire. This results in pasture management with a congested field having a large maze of fencing. The maze of posts makes it very difficult for the farmer or rancher to use tractors and implements for the conditioning and maintenance work necessary to maintain the pasture. Permanent fencing systems would also severely restrict the farmer's or rancher's ability to respond to varying conditions within the pasture which may dictate the need to define grazing areas that do not fit the existing arrangement of the permanent fencing system.

Accordingly there is a need for a portable fencing system that can be quickly and easily set up to define a small grazing area and then removed and set up at another grazing area. There is also a need for a portable fencing system that can be used to make corridors for the efficient movement of animals, or to otherwise manage the number and location of animals on the grazing areas. Such portable fencing system would give the pasture manager flexibility in providing for efficient grazing and recovery of the pasture. Thus, in order for rotational grazing to be optimized and labor minimized, the portable fencing system needs to be quick and easy to set up, securely anchored to the ground so that it will stay in place, and require few or no tools to install and remove it.

SUMMARY OF THE INVENTION

The present invention provides a stable, portable support device. In one embodiment, the support device satisfies the aforementioned need and meets all characteristics of the ideal portable fencing system. The portable support device of the present invention is strong, stable and durable, enables quick and easy setup only requiring shallow soil penetration to provide the needed anchorage of the device to the ground so as to stay in place and without the use of tools.

The present invention is directed to a portable support device that in one embodiment is useful for forming a temporary barricade, corridor or an enclosure arrangement. Briefly, the present invention comprises: (a) a support frame having a first member, a second member and a cross-brace member rigidly connected to the first and second members. The cross-brace member retains the first and second members in a substantially parallel spaced-apart orientation and may be used to facilitate vertically inserting the first and second members into the ground. The support device includes (b) a third member moveably, and desirably rotationally mounted to the cross-brace member. The third member includes a means for affixing the third member to the ground thereby angularly displacing the third member from the first and second members to form a stable triangular configuration. The support device may optionally include (c) an angled member having a face portion positioned between spaced-apart first and second ends. The first end is rigidly affixed to the first member and the second end is rigidly affixed to the second member. The face portion includes a wire reel or spool holding support means for hanging a reel or spool of wire fencing material of a predetermined length onto the support device.

Another aspect of the present invention is a method for forming a containment area utilizing the portable fencing device. The method includes the steps of: (a) in a substantially vertical orientation, inserting the first and second members into the ground to a predetermined depth and; (b) positioning the third member outwardly from the first and second members and affixing the third member to the ground; and (c) connecting a wire reel containing a predetermined footage and type of wire to the wire holding support means.

It is an object of the present invention to provide a portable fencing device useful for forming a barricade, corridor arrangement or an enclosure arrangement that is sturdy, easily setup and easily removed as necessary.

These and other objects and advantages of the present invention will become more apparent to those skilled in the art in view of the following description and the accompanying drawings wherein like parts and objects have similar reference numerals. It is to be understood that the inventive concept is not to be considered limited to the constructions disclosed herein but instead by the scope of the appended claims.

DETAILED DESCRIPTION OF THE INVENTION

Figure 1:
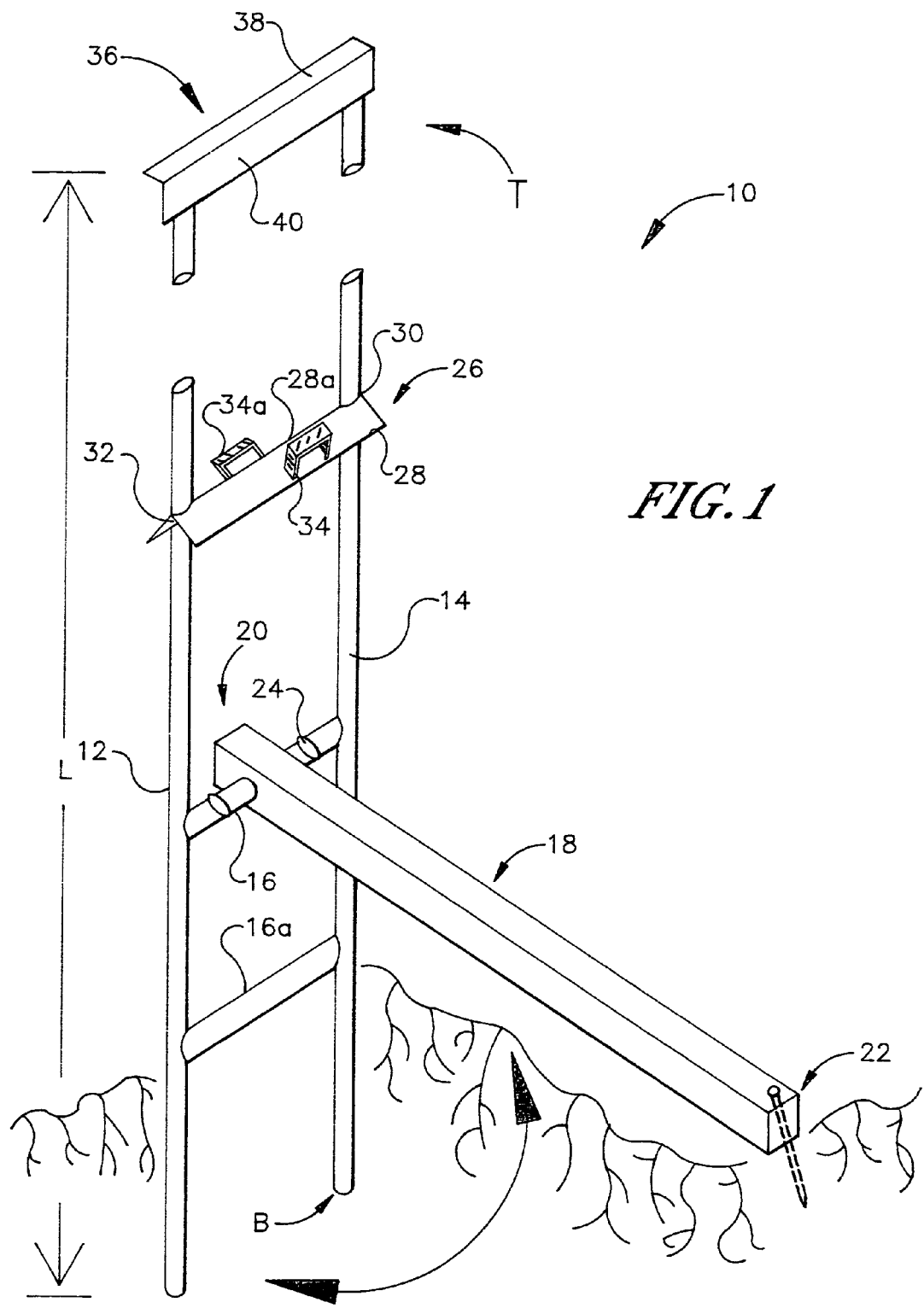
FIG. 1 is a perspective view of an exemplary embodiment of the present invention.
Figure 2:
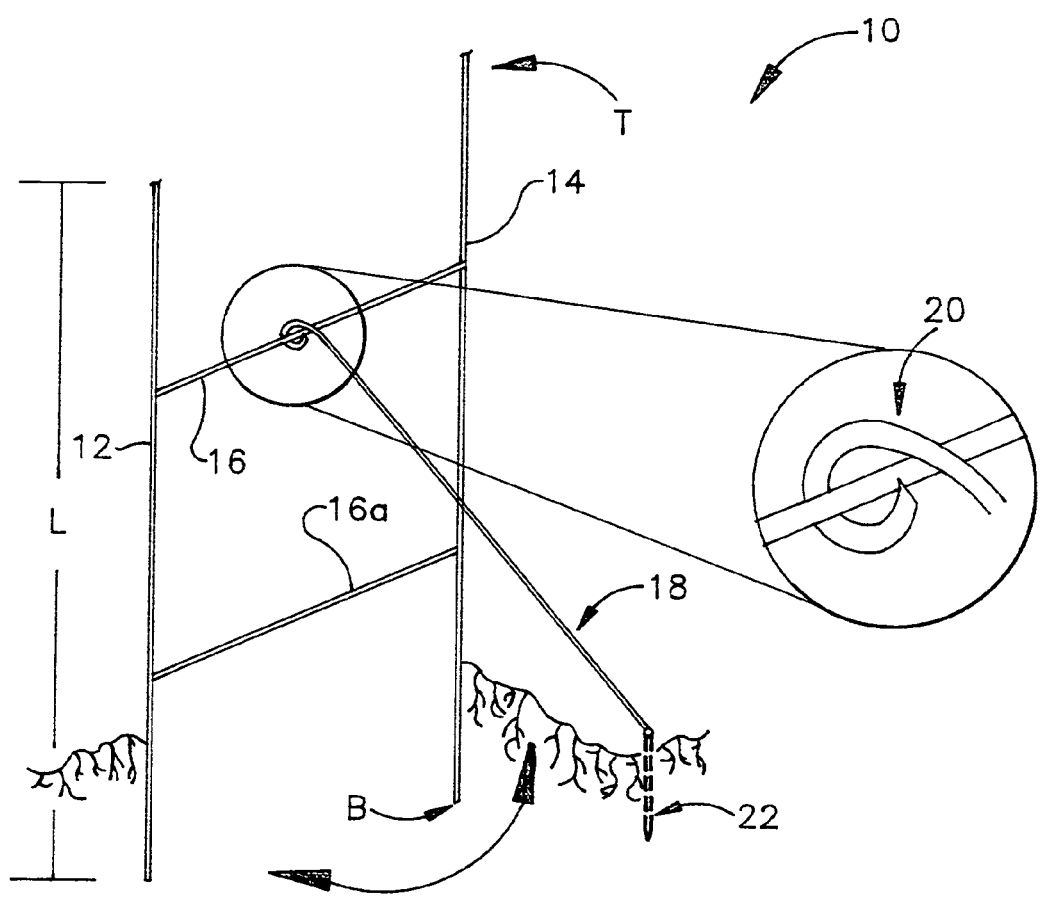
FIG. 2 is a perspective view of an alternative embodiment of the present invention.

Referring to FIGS. 1 and 2, there are illustrated exemplary embodiments of the portable support device 10 of the present invention. The support device 10 includes: a) a support frame having a first member 12 and a second member 14, a top portion "T", a bottom portion "B" and an overall length "L", as determined by the distance between the top "T" and the bottom "B". The support frame has an overall length "L" of from about 14 inches to about 60 inches, and preferably is from about 24 inches to about 60 inches, and more preferably from about 24 inches to about 42 inches. The first member 12 and second member 14 are configured in a substantially parallel, spaced-apart relationship. The first and second members 12 and 14, respectively, are connected together by a cross-brace member 16 having a first portion thereof rigidly connected to at least one portion of the first member 12 and a second portion connected to at least a portion of the second member 14. In a preferred embodiment, the cross-brace member is connected substantially perpendicular to the first and second members 12 and 14. As used herein, the terms "substantially" and "about" mean having a variance of not more than 30% of the stated value or range. For example the language of about 24 to about 60 inches means a range of from 17 inches to 31 inches on the low side and from 42 to 78 inches on the high side. Substantially "parallel" means having an angle deviation of not more than 30° relative to the other member. Desirably, the terms "substantially" and "about" mean having a variance of not more than 20% from the stated value, and more preferably not more than 15% from the stated value.

In a preferred embodiment the support device 10 includes a second cross-brace member 16a. The first cross-brace member 16 is placed a distance from the bottom "B" of from about 30 to about 80% of the length "L" and the second cross-brace member 16a is desirably positioned a distance from the bottom "B" of from about 2 to about 25% of the length "L". In a more preferred embodiment, the first cross-brace member 16 is placed a distance from the bottom "B" of from about 30 to about 60% of the length "L" and the second cross-brace member 16a is desirably positioned a distance from the bottom "B" of from about 5 to about 15% of the length "L".

In another embodiment, the ends of the second cross-brace member 16a may extend beyond the first member 12, the second member 14 or both. This provides an added degree of stabilization so when the fencing device 10 is inserted into the ground, the portion of the second cross-brace member 16a extending outwardly from the first member 12, the second member 14 or both will provide added lateral support for retaining the fencing device 10 in a substantially vertical configuration.

The support device 10 includes (b) a third member 18 having a first end 20 and a distally disposed free end 22. The first end 20 is positioned between the first and second members 12 and 14 and movably mounted to the cross-brace member 16. Desirably, the third member 18 is moveably mounted to the cross-brace member 16 at or proximate to the first end 20. Desirably the third member 18 is rotationally mounded to the cross-brace member 16. As illustrated in FIG. 1, the third member 18 is constructed from hollow square bar stock of a predetermined length. Means for rotationally mounting the third member 18 to the cross-brace member 16 can include a hole or channel through two parallel sides of the square bar stock through which the cross-brace member 16 is inserted prior to being affixed to the first member 12 and/or second member 14. Alternatively, the third member 18 can be comprised of flat stock having two or more parallel slits along the length and bending portions on either side of the slits in opposite directions to form an integral channel through which the cross-brace member passes, allowing the third member 18 to rotate about the cross-brace member 16.

On the free end 22 of the third member 18 is a means for removably affixing the third member 18 to the ground and angularly displacing the third member 18 from the first and second members 12 and 14. This forms a stable triangular configuration. Such affixing means includes a hole or slot in the free end 22 where a spike, nail, straight or cork-screwed shaped rod, or a piece of rebar is inserted and driven into the ground. In another embodiment, the affixing means is permanently mounted to the second end 22 by such means as welding or bolting the affixing means directly to the second end 22.

Referring to FIG. 2, in another embodiment, the third member 18 is a substantially rigid cylindrical member or rod having a loop at the first end 20 encircling the cross-brace member 16 and the means for affixing the third member 18 into the ground on the distal free end 22 of the third member 18 is a short portion bent at an obtuse angle and having a leg portion extending from the bend. The leg portion is inserted into the ground and braces the third member 18. Desirably, the leg portion has a length of from about 2 to about 6 inches, as measured from the bend to the end of the rod.

Referring again to FIG. 1, the cross-brace member 16 can include a centering means 24 positioned adjacent to the first end 20 of the third member 18. Preferably, the cross-brace member 16 includes two of such centering means 24 opposingly disposed adjacent to the third member 18 in such a manner as to limit the lateral movement of the first end 20 but still allow the third member 18 to have free rotation about the cross-brace member 16. The centering means 24 can be a clip, notch, polymeric O-ring inserted over the cross-brace member 16, or a protuberance. Desirably, the centering means 24 is a protuberance formed from a weld on at least a portion of the cross-brace member 16

In a preferred embodiment, the support device 10 further includes (c) an angled member 26 having a substantially flat face portion 28 positioned between a first end 30 and a distal second end 32. The first end 30 is affixed to at least a portion of the first member 12 and the second end 32 is affixed to at least a portion of the second member 14. Affixed to the face 28 is a wire spool or reel attachment means 34 for removably affixing a holding device or handle for a wire reel or spool to the support device 10. Holding devices for a wire spool or reel are well known in the fencing art and are not part of the present invention, but is mentioned for completeness in describing the fencing device 10 and its use. The attachment means 34 can be fabricated from channel iron welded to the face 28; flat stock bent in an appropriate manner to hold or secure a portion of a spool holding device and secured to the face 28 via welding or an adhesive, but welding is preferred; or can be an integral slot in the face 28 of sufficient width and length to accommodate a portion of the spool or wire handle.

In a preferred embodiment, the angled member 26 is fabricated from angle iron having a width of from 0.5 to about 3 inches, as determined from one edge to the center. Preferably, the angle iron has a width of from about 0.75 to about 2.0 inches. In another embodiment the support device 10 further includes a second face 28a and a second attachment means 34a similar to that described above attached to or a part of on the second face 28a.

Optionally, the top portion "T" of the fencing device 10 can include a cap 36 spanning across and having a portion thereof affixed to the first and second members 12 and 14, respectively. In a preferred embodiment, the cap 36 is fabricated from angle iron having a width of from 0.5 to about 2 inches, as determined from one edge to the center, and more desirably, the angle iron has a width of from about 0.75 to about 1.5 inches. The angle iron forming the cap 36 can be oriented in a manner so as to form a flat top portion 38 and a side portion 40. Advantageously, this orientation allows the cap 36 to be easily welded to an upper portion of the first and second members 12 and 14. The cap 36 further provides a flat surface for striking if the ground is hard or rocky during the installation of the fencing device 10.

To use the support device 10, a user sets the support device 10 at a predetermined location and inserts the bottom "B" of the first and second members 12 and 14 into the ground. This may be accomplished by placing a foot on the at least one cross-brace member 16 or in the case were two cross-braces are present, 16 and 16a, typically the lower cross-brace 16a is used to apply a downward force on the first and second members 12 and 14. Alternatively, in the preferred embodiment described above wherein the support device includes the cap 36, it can be used as a striking plate for striking with a hammer or other driving means to insert the support device 10 into the ground to a predetermined depth. Once placement is accomplished and the support device 10 is substantially vertically oriented the free end 22 of the third member 18 is secured against the ground using one or more of the aforementioned affixing means, such as inserting a spike, nail, rod, or a piece of rebar through a hole in the free end 22 and driving it into the ground. In the case where the affixing means is permanently affixed to the free end 22, such as illustrated in FIG. 2, the affixing means is driven into the ground thereby stabilizing the support device.

In the case were the support device is used in constructing a temporary fence, a wire spool having a predetermined amount of wire and connected to a handle or carrying means is removably attached to the attachment means 34 on the face 28 of the angle member 26. The wire on the reel or spool is then stretched and secured at a second location onto a pre-existing fencing means, such as an electric fence wire or barbed wire.

In the case where the length of pasture to be partitioned is greater than the length of wire afforded on one spool, the support device 10 can be placed mid-way and a second spool can be affixed to the second attachment means 34a to daisy chain the lengths of wire together without the need to permanently physically tie the wire on the two spools together. Advantageously, one will see that it is possible to traverse both short and long distances by using one or more of the support devices 10 of the present invention.

In another embodiment, the support device 10 of the present invention can be used to support temporary signage, such as the type seen during political campaigns, yard sales, or "for sale by owner". Typically such signage suffers from being bent, skewed, or twisted due to minor winds to the extent that the signage becomes ineffective in conveying the message. Accordingly, the support device of the present invention can be used to support such temporary signage in a more effective manner without loosing the advantage of being easily set-up and/or removed. When used in this manner, a user sets the support device 10 at a predetermined location and inserts the bottom "B" of the first and second members 12 and 14 into the ground. This may be accomplished by placing a foot on the at least one cross-brace member 16 or in the case were two cross-braces are present, 16 and 16a, typically the lower cross-brace 16a is used to apply a downward force on the first and second members 12 and 14 to insert the support device 10 into the ground to a predetermined depth. Once placement is accomplished and the support device 10 is substantially vertically oriented, the free end 22 of the third member 18 is secured against the ground and driving it into the ground to stabilize the support device 10. Once placement is accomplished, a sign or placard may be secured to the first and second members 12 and 14. In one embodiment, the signage includes front and back sides separated by a corrugated portion and at least a portion of the corrugated portion is inserted over the upwardly extending first and second members 12 and 14.

Having described the invention in detail, those skilled in the art will appreciate that modifications may be made to the various aspects of the invention without departing from the scope and spirit of the invention disclosed and described herein. It is, therefore, not intended that the scope of the invention be limited to the specific embodiments illustrated and described but rather it is intended that the scope of the present invention be determined by the appended claims and their equivalents. Moreover, all patents, patent applications, publications, and literature references presented herein are incorporated by reference in their entirety for any disclosure pertinent to the practice of this invention.

What is claimed is:

1. A portable support device comprising:
   a. a wire fencing support frame comprising:
      i) a first vertical post;
      ii) a spaced-apart second vertical post; and iii) a cross-brace member having a first portion thereof rigidly connected to said first vertical post and a second portion thereof rigidly connected to said second vertical post, wherein lower ends of said first and second vertical posts are adapted to be inserted into the ground to a predetermined depth; and b. a bracing rod having a first end and a distal free end, said first end being positioned between said first and second vertical posts and pivotably mounted about a central portion of said cross-brace member, said free end including a ground anchoring means for penetrating the ground and affixing said bracing rod to the ground, thereby forming a braced angular relationship to said first and second vertical posts; and c. an angled cross-member comprising:
i) a first end;
ii) a distal second end, wherein said first end is affixed to at least a portion of the first vertical post and said second end is affixed to at least a portion of the second vertical post;
iii) a first face portion extending between said first and second ends; and
iv) a first fencing wire reel or spool attachment means attached to said first face portion, said first attachment means comprising a first pair of parallel spaced apart sides extending outwardly from said first face portion and a first cap portion affixed to distal ends of said first pair of sides to define a first open channel for removably holding a handle of a wire reel or spool to the support device.

2. The support device of claim 1, wherein said first and second vertical posts are in a substantially parallel orientation.

3. The support device of claim 1, wherein said cross-brace member includes a centering means for centering said bracing rod on said cross-brace member.

4. The support device of claim 3, wherein said cross-brace member includes a second centering means for centering said bracing rod on said cross-brace member, wherein said second centering means is opposingly disposed relative to the first centering means and adjacent to said bracing rod.

5. The support device of claim 1, wherein said support frame has a top portion T, a bottom portion B and an overall length L, as determined by the distance between the top T and the bottom B, wherein the support frame has an overall length L of about 24 inches to about 60 inches, and wherein said cross-brace member is affixed to said first and second vertical posts a distance of about 30 to 80 percent of the length L from said bottom B.

6. The support device of claim 5, wherein said cross-brace member is affixed to said first and second vertical posts a distance of about 30 to about 60 percent of the length L from said bottom B.

7. The support device of claim 1, further comprising a second cross-brace member having a first portion connected to said first vertical post and a second portion connected to said second vertical post.

8. The support device of claim 1, wherein said angled cross-member includes a second face portion angularly disposed relative to said first face portion and having a second fencing wire reel or spool attachment means affixed to said second face portion, said second attachment means comprising a second pair of parallel spaced apart sides extending outwardly from said second face portion and a second cap portion affixed to distal ends of said second pair of sides to define a second open channel.

9. The support device of claim 1, further comprising a top cap having a first portion affixed to said first vertical post and a second portion affixed to said second vertical post, wherein said top cap is oriented to provide a substantially flat top surface between said first and second vertical posts.

10. A portable support device comprising:
a. a wire fencing support frame comprising:
i) a first vertical post;
ii) a spaced-apart second vertical post; and
iii) a cross-brace member having a first portion thereof rigidly connected to said first vertical post and a second portion thereof rigidly connected to said second vertical post, wherein said first and second vertical posts are in a substantially parallel orientation and wherein lower ends of said first and second vertical posts are adapted to be inserted into the ground to a predetermined depth;

b. a bracing rod having a first end and a distal free end, said first end being positioned between said first and second vertical posts and rotationally mounted about a central portion of said cross-brace member, said free end including a ground anchoring means for penetrating the ground and affixing said bracing rod to the ground, thereby forming a braced angular relationship to said first and second vertical posts;

c. an angled cross-member comprising:
i) a first end;
ii) a distal second end, wherein said first end is affixed to at least a portion of the first vertical post and said second end is affixed to at least a portion of the second vertical post;
iii) a first face portion extending between said first and second ends; and
iv) a first fencing wire reel or spool attachment means attached to said first face portion, said first attachment means comprising a first pair of parallel spaced apart sides extending outwardly from said first face portion and a first cap portion affixed to distal ends of said first pair of sides to define a first open channel for removably holding a handle of a wire reel or spool to the support fencing device; and d. a top cap having a first portion affixed to said first vertical post and a second portion affixed to said second vertical post, wherein said top cap is oriented to provide a substantially flat top surface between said first and second vertical posts.

11. The portable support device of claim 10, further comprising a second cross-brace member having a first portion connected to said first vertical post and a second portion connected to said second vertical post.

12. The portable support device of claim 10, wherein said angled cross-member includes a second face portion angularly disposed relative to said first face portion and having a second fencing wire reel or spool attachment means affixed to said second face portion, said second attachment means comprising a second pair of parallel spaced apart sides extending outwardly from said second face portion and a second cap portion affixed to distal ends of said second pair of sides to define a second open channel.

13. The portable support device of claim 10, wherein said cross-brace member includes a centering means for centering said bracing rod on said cross-brace member.

14. The portable support device of claim 13, wherein said cross-brace member includes a second centering means for centering said bracing rod on said cross-brace member, wherein said second centering means is opposingly disposed relative to the first centering means and adjacent to said bracing rod.

15. A method for erecting a temporary fence comprising:
a. providing a portable support device comprising:
a.) a wire fencing support frame comprising:
i) a first vertical post;
ii) a spaced-apart second vertical post;
iii) a cross-brace member having a first portion thereof rigidly connected to said first vertical post and a second portion thereof rigidly connected to said second vertical post;
b.) a bracing rod having a first end and a distal free end, said first end being positioned between said first and second vertical posts and pivotably mounted about a central portion of said cross-brace member, said free end including a ground anchoring means for penetrating the ground and affixing said bracing rod to the ground, thereby forming a braced angular relationship to said first and second vertical posts; and
c.) an angled cross-member comprising:
i) a first end;
ii) a distal second end, wherein said first end is affixed to at least a portion of the first vertical post and said second end is affixed to at least a portion of the second vertical post;
iii) a first face portion extending between said first and second ends; and
iv) a first fencing wire reel or spool attachment means attached to said first face portion, said first attachment means comprising a first pair of parallel spaced apart sides extending outwardly from said first face portion and a first cap portion affixed to distal ends of said first pair of sides to define a first open channel;
b. inserting lower ends of the first and second vertical posts into the ground at a predetermined depth;
c. securing the ground anchoring means of the bracing rod into the ground;
d. affixing a handle of a wire reel or spool into the first open channel defined by the first attachment means; and
e. securing an end of the wire on the wire reel or spool onto an electric fence wire or barbed wire of a pre-existing fence.

* * * * *